United States Patent

Berg et al.

[11] Patent Number: 5,916,314
[45] Date of Patent: Jun. 29, 1999

[54] METHOD AND APPARATUS FOR CACHE TAG MIRRORING

[75] Inventors: Thomas B. Berg, Portland, Oreg.; Tapas Datta, Bangalore, India

[73] Assignee: Sequent Computer Systems, Inc., Beaverton, Oreg.

[21] Appl. No.: 08/712,090

[22] Filed: Sep. 11, 1996

[51] Int. Cl.⁶ ..................................................... G06F 13/00
[52] U.S. Cl. .................................................. 714/6; 714/54
[58] Field of Search ................... 395/182.04, 182.06, 395/182.03, 185.01, 185.02, 185.05; 371/49.4, 51.1; 711/122, 146; 714/6, 5, 48, 49, 52, 54

[56] References Cited

U.S. PATENT DOCUMENTS

| | | | |
|---|---|---|---|
| 4,483,003 | 11/1984 | Beal | 371/51 |
| 4,945,512 | 7/1990 | DeKarske et al. | 365/49 |
| 5,319,766 | 6/1994 | Thaller et al. | 395/425 |
| 5,361,267 | 11/1994 | Godiwala et al. | 371/40.1 |
| 5,509,119 | 4/1996 | LaFetra | 395/185.05 |
| 5,530,958 | 6/1996 | Agarwal et al. | 395/403 |
| 5,548,742 | 8/1996 | Wang et al. | 395/455 |
| 5,553,264 | 9/1996 | Özveren et al. | 395/462 |
| 5,564,035 | 10/1996 | Lai | 395/471 |
| 5,617,347 | 4/1997 | Lauritzen | 365/49 |
| 5,629,950 | 5/1997 | Godiwala et al. | 371/51.1 |
| 5,666,513 | 9/1997 | Whittaker | 711/118 |
| 5,696,937 | 12/1997 | White et al. | 395/469 |

Primary Examiner—Robert W. Beausoliel, Jr.
Assistant Examiner—Norman Michael Wright
Attorney, Agent, or Firm—Klarquist Sparkman Campbell Leigh & Whinston, LLP

[57] ABSTRACT

In a digital computer with a cache comprised of N sets labeled 0 to N-1, cache tag memory for each set is divided into primary and mirror parts, each part with sufficient capacity to store a number of cache tags equal to the number of cache blocks storable in a cache memory associated with each set. Every modification or installation of cache tags in the primary part of a set x is accompanied or followed by identical modification or installation of cache tags in the mirror part of a set $F(x)$, where $F$ is a one-to-one function that maps the set of integers from 0 to N-1 onto itself. Cache tag lookup retrieves a first set of N cache tags from the primary part of each cache tag memory, and parity checking is performed on each tag. If a parity error is found, a set of cache tags is retrieved from the mirror part of the cache tag memories, and parity checking is again performed. If no error is found, cache processing proceeds normally. The cache tag memories are preferably SRAMs with a mirror enable bit driven by a cache controller such that tags are installed in or read from either a primary part or a mirror part of the SRAM depending on the value of the mirror enable bit.

24 Claims, 3 Drawing Sheets

METHOD AND APPARATUS FOR CACHE TAG MIRRORING

FIELD OF THE INVENTION

This invention relates generally to cache memory management in digital computer systems. More particularly, this invention relates to a method and apparatus for providing an efficient means of avoiding or reducing cache tag errors by cache tag mirroring.

BACKGROUND OF THE INVENTION

The speed and data path width of microprocessors is continually increasing. As processor performance has increased, memory access has become a bottleneck to overall system performance. Use of cache memory is one way to speed memory access.

A cache memory is a memory that is located functionally between a processor and main memory. The cache memory is generally faster but smaller than main memory. The cache memory decreases effective memory access time by storing copies of portions of the contents of main memory. When a local processor performs certain "cachable" operations requiring memory access, the cache memory is checked first to determine if it contains a copy of the information to be accessed. If so, the processor will perform the operation using the cache memory without accessing main memory. A cache "hit" occurs when the information to be accessed by a cachable operation is stored in the cache memory; a "miss" occurs when the information is not stored in the cache memory.

A cache memory may also be accessed by operations originating other than in a local processor, such as by operations relating to updating main memory or updating other caches, or by operations resulting from requests from other processors in multiprocessor systems. In each case of cache memory access, a cache "hit" or "miss" must first be determined.

For purposes of cache organization, main memory addresses are typically divided into two or three fields. The highest order field is used as a tag comparison field. The next lower order field is used as a cache address field to address a cache tag memory and the cache memory itself. The lowest order field, if any, is used to specify locations within a block of cache memory.

When the contents of a given main memory address are copied to the cache memory, they are copied to the cache address given by the cache address field of the main memory address. The tag comparison field of the main memory address is written as an "address tag" to the cache tag memory at the same cache address. Along with the address tag, a state tag and error detection and/or correction bit(s) may be written to the cache tag memory at the same cache address. The address tag, together with an associated state tag and any error detection/correction bit(s) form a "cache tag."

To determine if the contents of a given main memory address are stored in the cache, the cache address field of the given main memory address is asserted on the address lines of the cache tag memory. In response, the cache tag memory returns the cache tag stored for that cache address. If the address tag of the returned cache tag matches the tag comparison field of the given main memory address, and if the state tag shows an appropriate state and the error bit(s) indicates no error, a hit is indicated.

If the contents of the cache tag memory become corrupted, cache memory accesses that should miss may hit, resulting in potentially disastrous processing errors. To avoid false hits and other serious errors, some method of error checking is generally performed over the address tag and state tag. A parity bit may be used, for example, to detect single bit errors. Error detection and correction (EDC) codes may also be used to both detect and correct errors.

A one-bit cache tag memory error is efficiently detected by use of a single parity bit. But if a single parity bit is used for error detection, no error correction is possible, and a fatal error generally must be returned whenever an error is detected, requiring shut-down and re-initialization of the system. When a cache tag memory error is detected with EDC, certain errors may be corrected, avoiding a system shut-down, but the generation and checking of EDCs can slow down routine cache memory access significantly.

SUMMARY OF THE INVENTION

The present invention provides a method and apparatus whereby single bit cache tag memory errors may be recovered without significant slowing of cache memory processing. The invention includes a method for conveniently and efficiently mirroring, i.e., storing in parallel, all cache tags stored in cache tag memory. Each cache tag is stored twice: As a primary cache tag and as a mirrored cache tag. The primary cache tags and the mirrored cache tags are each stored with a parity bit. Cache hits and misses are determined in the normal fashion using the primary tags with parity checking. Only upon the occurrence of a cache tag parity error are any additional steps required.

On detection of a cache tag parity error in the primary cache tags ("primary tags"), a non-fatal error is signaled and the mirrored cache tags ("mirrored tags") are read. If no parity error is found in the mirrored tags, processing proceeds as usual according to the information in the mirrored tags, avoiding the necessity of a shutdown. If a parity error is detected in the mirrored tags, a fatal error is signaled.

The invention thus provides a convenient and efficient method for achieving essentially all the processing speed of a typical cache memory with single parity bit error detection, but at the same time providing the ability to recover from a one-bit cache tag memory error without a system shutdown. Other advantages and features of the invention will be apparent from the detailed description of a preferred embodiment below, which proceeds with reference to the following Figures.

DETAILED DESCRIPTION OF A PREFERRED EMBODIMENT

Figure 1:
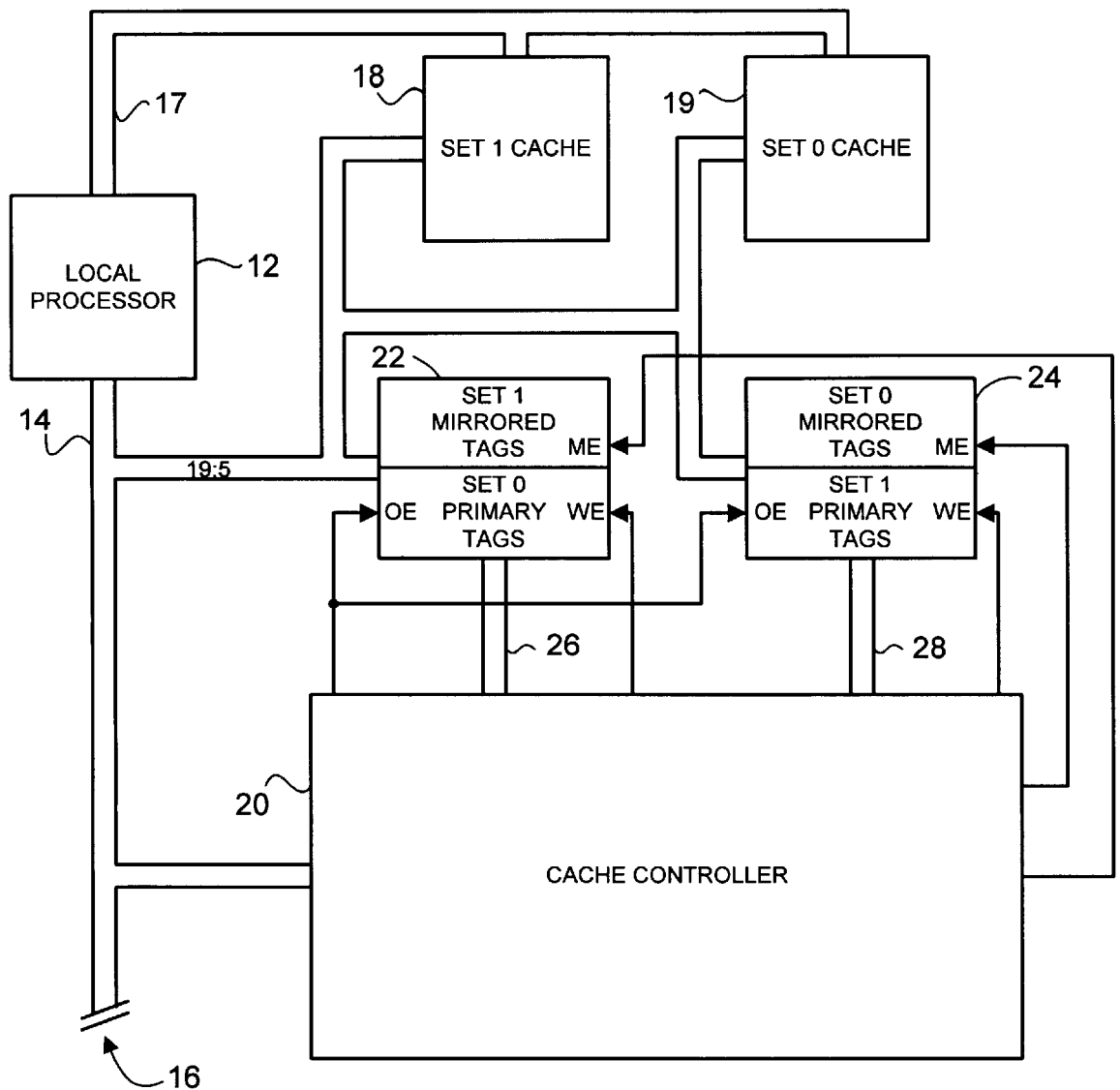
FIG. 1 is a diagram of a portion of a computer system arranged according to the present invention.

The present invention includes an apparatus and method for efficient cache tag mirroring, and will be described below with respect to a preferred embodiment implemented in a computer system employing a 32-bit main memory address. The invention is of course applicable to systems having other address lengths.

The cache memory of the present invention is organized into N sets as an N-way set associative cache, each set having a cache memory and a cache tag memory, with N preferably 2 or 4. The cache memory of each set is preferably divided into cache blocks. The presently preferred cache block size is 32 bytes. Bits 4:0 of the 32-bit main memory address are thus used to specify a particular byte within a given cache block.

The size of the cache address field varies with the cache memory capacity of the sets. For example, bits 18:5 are used as the cache address field for sets with a capacity of 16K cache blocks. Bits 19:5 are used with sets with a capacity of 32K cache blocks. Bits 20:5 are used with sets with a capacity of 64K cache blocks. Bits 21:5 are used with sets with a capacity of 128K cache blocks. The remaining upper order bits (31:x) comprise the tag comparison field.

The cache tag memory for each set is sized to hold at least twice as many tags as the number of cache blocks held in the cache memory for each set, to provide sufficient cache tag memory for the cache tag mirroring described below.

The description below assumes N=2 and assumes a cache memory capacity in each set of 32K cache blocks, such that the cache address field is comprised of bits 19:5, and the tag comparison field of bits 31:20. The cache tag memory is accordingly sized to hold at least 64k tags, and thus has at least 16 address bits, one more bit than the cache address field. The extra bit is used as a mirror enable (ME) bit to control the reading and writing of mirrored cache tags as will be described.

A diagram of a portion of a computer system arranged according to the present invention is shown in FIG. 1. A local processor 12 is connected to an address bus 14. The address bus 14 is also connected to a cache controller 20 and at location 16 to a system bus, other processors, and/or similar devices. Address bits 19:5 from the address bus 14 are fed in parallel to the address pins of two cache tag SRAMs 22 and 24, sized to hold at least 64k tags. The address bits 19:5 are also fed to the address lines of cache memories 18 and 19, which store cached information. Cache memories 18 and 19 transmit and receive cached information to and from the local processor 12 over a data bus 17.

The cache controller 20 receives and delivers cache tags to and from the cache tag SRAMs 22 and 24 over the data lines 26 and 28 respectively. Each cache tag includes an address tag, corresponding to main memory address bits 31:20, a state tag (preferably two bits), and a parity bit generated over the address tag and the state tag.

An output enable signal OE is provided by the cache controller 20 to the cache tag SRAMs 22 and 24 as indicated. A write enable WE signal (i.e., a write enable bit) is provided by the cache controller 20 to the cache tag SRAMs 22 and 24 individually on write enable lines as indicated. A mirror enable ME bit is also supplied individually by the cache controller 20 by mirror enable lines to a mirror enable input on each of the cache tag SRAMs 22 and 24, as indicated. Each mirror enable input in this embodiment is an address line selected from the address lines of SRAMs 22 and 24.

As with any set associative cache, cache tag lookups proceed in parallel in each of the N sets. The cache tag SRAMs 22, 24 are assigned a designation, such as set 0 for cache tag SRAM 22 and set 1 for cache tag SRAM 24. When a cache tag lookup is performed, the cache address field (bits 19:5) of the main memory address of the information needed for a given desired operation is asserted simultaneously on the address pins of each cache tag SRAM, along with a 0 from cache controller 20 on both ME bits. The address tags of the cache tags returned from each cache tag SRAM are then simultaneously compared by the cache controller 20 to the tag comparison field of the desired main memory address to detect any match. A parity check is also performed on each returned cache tag. If a match is found with no parity error (and with an appropriate state tag code), a hit is signalled and the operation proceeds using the information located in the cache block at the cache address in the cache memory of the set which hit. If a miss occurs with no parity errors, the desired information is retrieved from main memory and stored in the cache memory of one of the sets according to an LRU (least recently used) algorithm, and the associated cache tag is updated.

The preferred embodiment of the present invention makes a particularly beneficial use of the parallel structure inherent in a set associative cache. The architecture of a set associative cache is designed for parallel hit detection as described above in order to preserve high hit detection speed while providing increased cache capacity. Yet cache tags are installed and updated one at a time, such that the inherently parallel structure of a set-associative cache is not utilized during installation and updating of cache tags. The preferred embodiment of the present invention utilizes this dormant parallel capacity.

According to the preferred embodiment of the present invention, installation and updating of any one cache tag is performed in parallel in both cache tag SRAM 22 and cache tag SRAM 24, allowing mirroring of cache tags without significant increase in cache processing time. This is accomplished by the cache controller 20 properly setting the ME (mirror enable) bit in each of the cache tag SRAMs 22, 24.

If a tag is to be installed in set 0, the cache controller 20 sets the ME bit of the cache tag SRAM 22 to 0 and write enables the cache tag SRAM 22, so that set 0 tags are stored in the primary part of the cache tag SRAM 22. The cache controller 20 also simultaneously sets the ME bit of the cache tag SRAM 24 to 1 and write enables the cache tag SRAM 24, so that set 0 tags are mirrored in the mirror part of the cache tag SRAM 24. Installation of set 1 tags proceeds similarly with installation in the primary part of the cache tag SRAM 24 and in the mirror part of the cache tag SRAM 22.

Tag lookups obtain tags from the primary part of each cache tag SRAM first. If a tag parity error is detected in either set of primary tags, state sequencing within the cache controller 20 is reset or appropriately paused, a non-fatal error is signaled, and the ME bits of both cache tag SRAMs 22 and 24 driven high. The mirrored tags are then read. If no parity error is detected in either set of mirrored tags, processing proceeds normally, but with the cache tag received by cache controller 20 from cache tag SRAM 22 treated as if received from cache tag SRAM 24, and vice versa. This swapping insures that hits register in the proper set. If a parity error is detected on the mirrored tag lookup, a fatal error is signaled and appropriate fatal error response processes are initiated.

Figure 3:
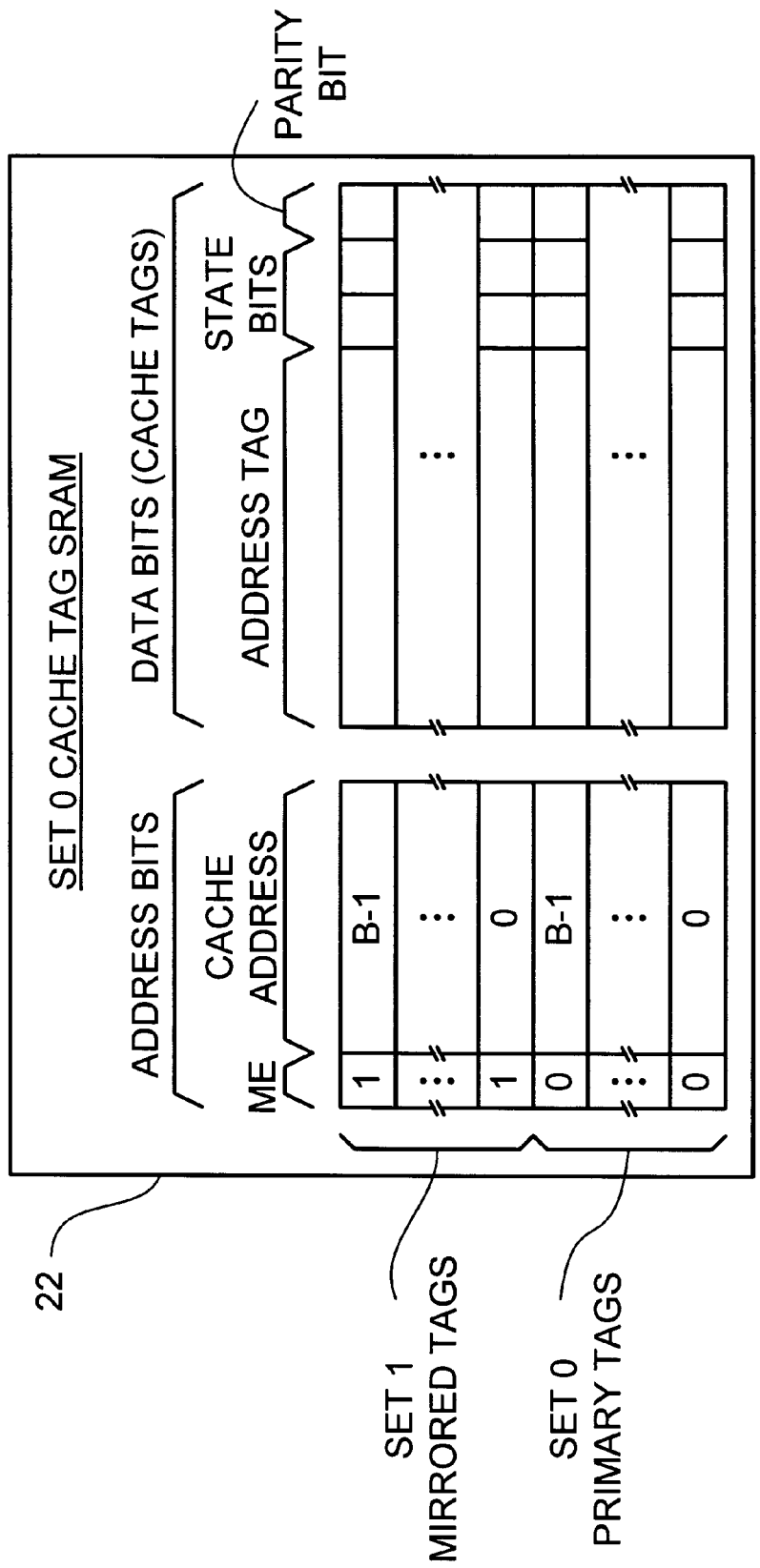
FIG. 3 is a diagram illustrating the use of SRAM 22 of FIG. 1.

FIG. 3 is a diagram illustrating the use of the set 0 cache tag SRAM 22 of FIG. 1. As shown in the "ADDRESS BITS" column in the proposed FIG. 3, the primary cache tags (a total of B tags, where B is the number of cache blocks) are stored at addresses at which the mirror enable ME bit is 0. The set 1 mirrored cache tags (a total of B tags, where B is the number of cache blocks) are stored in addresses at which the memory enable bit ME is 1. The total number of cache tags stored in SRAM 22 is thus 2·B, i.e., twice the number of cache blocks B. As shown in the "DATA BITS (CACHE TAGS)" column, each cache tag includes an address tag (comprising multiple bits), two state bits, and a parity bit. The mirror enable input ME is used as an address bit to control access to the mirrored tags.

Figure 2:
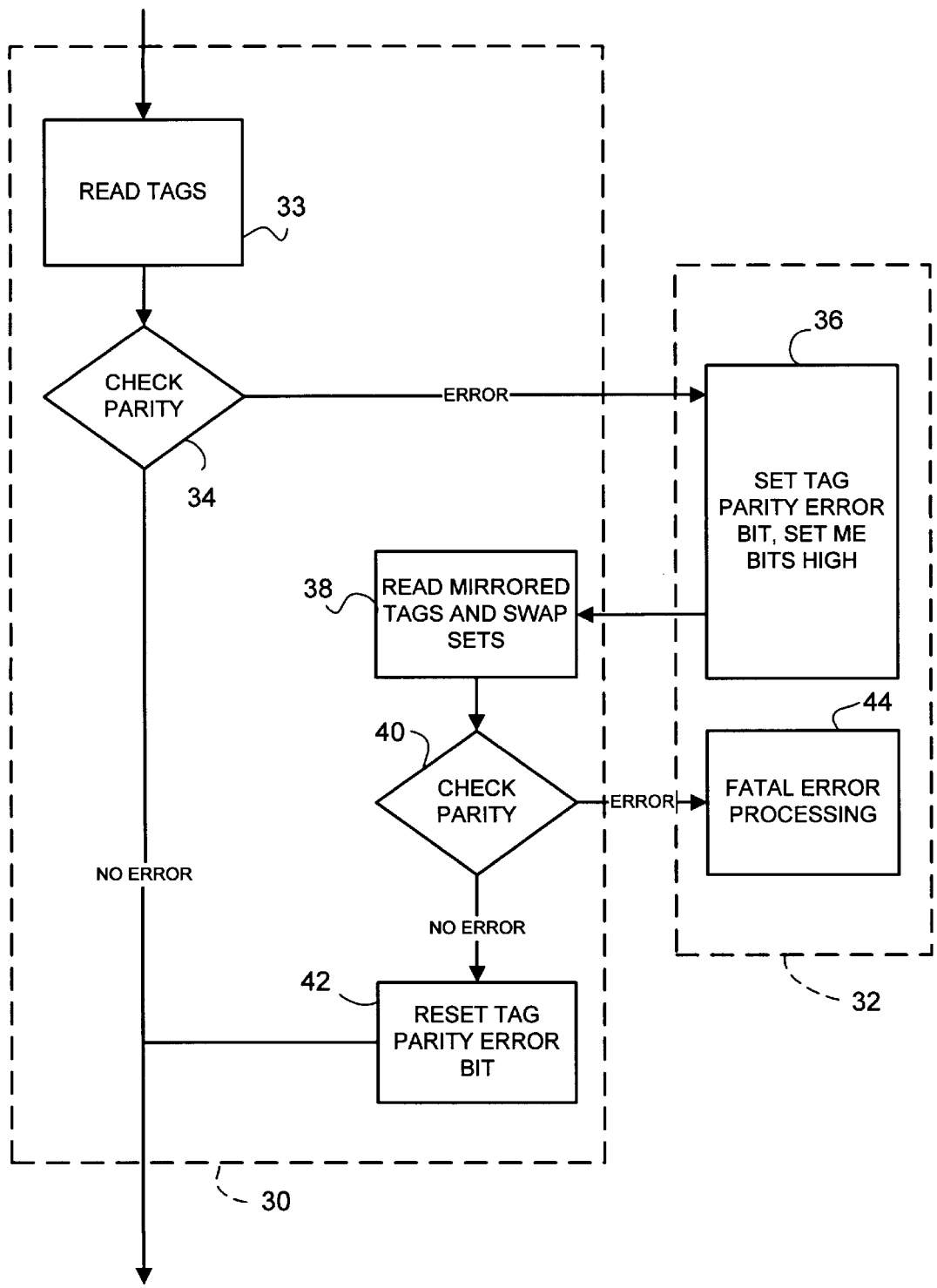
FIG. 2 is a flow diagram showing an organization for performing functions within cache controller 20 of FIG. 1.

A currently preferred organization within the cache controller 20 for implementing the mirrored tag lookup described above is diagrammed in FIG. 2. A given state machine 30 defined within the cache controller 20 controls a process requiring or permitting cache access. At some point, the processing within the state machine 30 performs a cache tag read 33 and a parity check 34. If a parity error is found, the state machine 30 signals a non-fatal error, which starts a special state machine 32. The special state machine 32 performs a setting 36 of a tag parity error bit and of the ME bits.

The special state machine 32 is then exited, and state machine 30 performs a mirrored cache tag read 38 along with a logical swap of the two sets of tags. The swap may conveniently be triggered by the previously set tag parity error bit. A parity check 40 is performed. If a parity error is detected with the tag parity error bit already set, a fatal error is signaled, which causes re-entry into the special state machine 32 for fatal error processing 44. The state machine 30 then goes to an idle state (not shown), typically without completing any remaining states. If no parity error is found at parity error check 40, the state machine 30 performs a reset 42 of the tag parity error bit and continues with further processing according to the result of the tag lookup.

Upon detection of a parity error at the parity check 34, processes that are typically started upon tag lookup may need to be paused or otherwise inhibited. For example, miss processing, hit processing, and error processing (other than parity error processing) should be prevented. Further, any devices, processes, or state machines dependent upon the tag lookup should be either paused or restarted, such that the mirrored tag read 38 will proceed, except in the case of a mirrored tag parity error, essentially identically to the initial tag read 33.

In the presently preferred embodiment of the invention, all mirrored tags are read at once, providing a processing flow which is similar to the initial tag read, but this is not required. Instead, if desired, the mirrored tag lookup itself, as well as any processing after the mirrored tag lookup, could be performed only on the tags of the set or sets which had a parity error detected in the primary tags.

It is similarly presently preferred not to update the primary tags after a no-error read of the mirrored tags. This provides streamlined processing for the great majority of reads in which no parity error occurs. If desired, however, appropriate updating of the primary tags could be performed after a no-error read of the mirrored tags.

It is similarly currently most preferred to write or update a primary and corresponding mirrored tag simultaneously. This may also be modified, however, if desired, so that primary tags and mirrored tags for a given set may be stored in the same SRAM or in a second, parallel SRAM. Storing primary and mirrored tags in the same SRAM avoids the need for swapping the tags on a mirrored tag read, but prevents parallel (i.e., simultaneous) installation and updating. Using a second, parallel SRAM could both avoid swapping and allow parallel installation and updating, but would double the number of SRAMs required.

The present invention need not be implemented in physically separate RAMs or SRAMs. Those of skill in the art will likewise recognize that while the description above includes certain hardware-type and software-type components, all of these may be realized to a greater or lesser degree in software and/or hardware.

While the above description of the preferred embodiment of the invention is made with respect to a two-way set associative cache, the embodiment is easily extended to N-way set associative caches. In an N-way set associative cache, a tag with its associated state bits and parity bit would be installed or modified in a primary part of the cache tag memory of a set x, and in the mirror part of a cache tag memory of a set y, where y is given by $F(x)$, where $F(x)$ is any one-to-one function mapping the N sets onto themselves. Where the primary and mirror parts of each cache tag memory are implemented in a single SRAM and parallel installation and updating are desired, $F(x)$ is further defined such that $F(x) \neq x$.

An example one-to-one function is $F(x)=mod(x+c)/N$ where c is a constant non-negative integer less than N, and where the sets are labeled $0, 1 \ldots N-1$. For $F(x)$ such that $F(x) \neq x$, c is selected such that $c \neq 0$. Other one-to-one functions could of course be used.

In view of the many possible embodiments to which the principles of the invention may be applied, it should be recognized that the illustrated embodiment is only a presently preferred example of the invention and should not be taken as a limitation on the scope of the invention. Rather, the invention is defined by the following claims, and encompasses all embodiments that come within the scope and spirit of the claims.

We claim:

1. A method of cache tag mirroring comprising the steps of:
    (a) providing a cache organized into N sets designatable as sets 0 to N-1 where N is an integer greater than 1, each integer from 0 to N-1 inclusive representing a set, each set having associated therewith
        (i) a cache memory for storing a number of cache blocks, and
        (ii) a cache tag memory for storing cache tags each including a parity check bit, said cache tag memory having a capacity to store at least a number of cache tags equal to twice the number of cache blocks, said cache tag memory being divided into first and second parts;
    (b) installing primary cache tags each including a single parity check bit into the first part of a set x cache tag memory, and mirrored cache tags identical to said primary cache tags into the second part of a set y cache tag memory, where x is an integer from 0 to N-1 inclusive and where $y=F(x)$, $F(x)$ being a one-to-one function that maps the set of integers from 0 to N-1 onto itself;
    (c) when cache access is required by a desired operation, reading a group of N primary cache tags simultaneously from the first part of the cache tag memory of each set and checking each of the group of N primary cache tags for first parity errors;
    (d) whenever a first parity error is found in a primary cache tag from the first part of the cache tag memory of a set z, where set z is one of the sets 0 to N-1, z being an integer from 0 to N-1, reading a corresponding mirrored cache tag from the second part of the cache tag memory of the set $F(z)$ and checking said corresponding mirrored cache tag for a second parity error and proceeding with the desired operation if no second parity error is found.

2. The method of claim 1 wherein N=2.

3. The method of claim 1 wherein each cache tag memory is implemented in a single memory device.

4. The method of claim 3 wherein the step of installing identical cache tags comprises simultaneously installing identical primary and mirrored cache tags, and wherein F(x) is chosen such that F(x)≠x.

5. The method of claim 1 wherein the first and second parts of each cache tag memory are simultaneously accessible.

6. The method of claim 5 wherein the first and second parts of each cache tag memory are implemented in separate memory devices.

7. The method of claim 5 wherein F(x) is defined such that F(x)=x.

8. The method of claim 1 wherein the step of reading a corresponding mirrored cache tag further comprises simultaneously reading corresponding mirrored cache tags from the second part of the cache tag memory of every set in relation to which a first parity error was detected in the corresponding primary cache tag.

9. The method of claim 1 wherein the step of reading a corresponding mirrored cache tag further comprises simultaneously reading N corresponding mirrored cache tags from the second part of the cache tag memory of each set.

10. The method of claim 9 further including the step of treating, for purposes of the desired operation, the N corresponding mirrored cache tags from sets F(0) through F(N-1) inclusive as if they came from sets 0 through N-1 respectively.

11. The method of claim 1 wherein $F(x)=\mod(x+c)/N$ where c is a non-negative integer less than N.

12. The method of claim 1 further comprising the step of proceeding with the desired operation when no first parity errors are found.

13. The method of claim 1 further comprising the step of generating a non-fatal error signal when a first parity error is found.

14. The method of claim 1 further comprising the step of generating a fatal error signal when a second parity error is found.

15. The method of claim 1 wherein each cache tag comprises an address tag and a state tag.

16. The method of claim 15 further comprising the step of determining parity over the address tag and the state tag.

17. The method of claim 1 further comprising the step of, when a first parity error is found, inhibiting processes dependent on reading the cache tags from entering any of hit processing, miss processing, and error processing other than parity error processing.

18. The method of claim 1 wherein said cache stores information accessed by a local processor in a multiprocessor system.

19. The method of claim 1 further comprising the step of, when a first parity error is found in a primary cache tag from the first part of the cache tag memory of a set z and no second parity error is found in the corresponding mirrored cache tag from the second part of the cache tag memory of set F(z), making the primary cache tag in the first part of the cache tag memory of set z identical to the corresponding mirrored cache tag in the second part of the cache tag memory of set F(z).

20. The method of claim 1 further comprising the step of, when a first parity error is found in a primary cache tag from the first part of the cache tag memory of a set z and no second parity error is found in the corresponding mirrored cache tag from the second part of the cache tag memory of set F(z), treating the mirrored cache tag for purposes of further processing as if it came from set z.

21. A method of cache tag mirroring comprising the steps of:

(a) providing a cache comprising first and second sets, each set having
  (i) a cache memory for storing a number of cache blocks, and
  (ii) a cache tag memory for storing cache tags each comprising an address tag, a state tag, and a parity check bit, said cache tag memory having a capacity to store at least a number of cache tags equal to twice the number of cache blocks, said cache tag memory being divided into first and second parts;

(b) installing identical cache tags simultaneously into the first part of the cache tag memory of the first set and into the second part of the cache tag memory of the second set;

(c) when cache access is required by a desired operation, reading a first pair of cache tags simultaneously from the first part of the cache tag memory of both the first and second sets and checking each of the first pair of cache tags for first parity errors;

(d) when a first parity error is found, reading a second pair of cache tags simultaneously from the second part of the cache tag memory of both the first and second sets and checking each of the second pair of cache tags for second parity errors and proceeding with the desired operation if no second parity error is found.

22. The method of claim 21 further comprising the step of, when a first parity error is found and no second parity error is found, in further processing treating the second pair of cache tags from the second part of the cache tag memory of both the first and second sets as if each member of the pair came from the other set.

23. A digital processing system arranged for cache tag mirroring, comprising:

(a) N cache sets designatable by integers 0 to N-1, where N is an integer greater than 1, each set comprising
  (i) a cache memory for storing a number B of cache blocks, and
  (ii) a cache tag memory for storing a number of cache tags each comprising an address tag, a state tag, and a parity bit, the cache tag memory having data lines, address lines, a write enable input, a mirror enable input, and sufficient capacity to store 2 B cache tags; and (b) a cache controller connected to the data lines of the cache tag memory of each set, said cache controller having N mirror enable lines designatable as 0 to N-1, with each mirror enable line connected to the mirror enable input of the cache tag memory of the respective corresponding set, and having N write enable lines designatable as 0 to N-1, with each write enable line connected to the write enable input of the cache tag memory of the respective corresponding set, said cache controller writing each cache tag to be written both to a set x cache tag memory and to a set y cache tag memory by asserting the write enable bits of set x and set y and the mirror enable bit of set y, where x is an integer from 0 to N-1 inclusive and y=F(x), where F(x) is a one-to-one function mapping the set of integers 0 to N-1 onto itself, whereby cache tags stored in the set x cache tag memory are mirrored in the set y cache tag memory.

24. The digital processing system of claim 23 wherein N=2.

* * * * *